US010027740B2

(12) United States Patent
González Brenes et al.

(10) Patent No.: US 10,027,740 B2
(45) Date of Patent: Jul. 17, 2018

(54) SYSTEM AND METHOD FOR INCREASING DATA TRANSMISSION RATES THROUGH A CONTENT DISTRIBUTION NETWORK WITH CUSTOMIZED AGGREGATIONS

(71) Applicant: Pearson Education, Inc., New York, NY (US)

(72) Inventors: José Pablo González Brenes, San Diego, CA (US); Ilya Goldin, Pittsburgh, PA (US); Johann A. Larusson, Phoenix, AZ (US); John Behrens, South Bend, IN (US); Thomas Mctavish, Denver, CO (US)

(73) Assignee: PEARSON EDUCATION, INC., New York, NY (US)

( * ) Notice: Subject to any disclaimer, the term of this patent is extended or adjusted under 35 U.S.C. 154(b) by 239 days.

(21) Appl. No.: 14/927,145

(22) Filed: Oct. 29, 2015

(65) Prior Publication Data
US 2016/0127244 A1 May 5, 2016

Related U.S. Application Data

(60) Provisional application No. 62/073,751, filed on Oct. 31, 2014.

(51) Int. Cl.
*G06F 15/16* (2006.01)
*H04L 29/08* (2006.01)
*H04L 12/891* (2013.01)
*H04L 29/06* (2006.01)

(52) U.S. Cl.
CPC .............. *H04L 67/10* (2013.01); *H04L 47/41* (2013.01); *H04L 67/02* (2013.01); *H04L 67/1097* (2013.01); *H04L 67/125* (2013.01); *H04L 67/2833* (2013.01); *H04L 67/306* (2013.01);
(Continued)

(58) Field of Classification Search
USPC ......................................................... 709/217
See application file for complete search history.

(56) References Cited

U.S. PATENT DOCUMENTS 6,772,202 B2 * 8/2004 Wright .................... H04L 29/06
   709/217
7,184,844 B2 * 2/2007 Dausch .................. G07C 5/008
   340/3.1

(Continued)

*Primary Examiner* — Alicia Baturay
(74) *Attorney, Agent, or Firm* — Kilpatrick Townsend & Stockton LLP

(57) ABSTRACT

Systems and methods for increasing data transmission rates through a content distribution network by generating a customized aggregation comprising data packets selected to maximize a data acceptance rate are disclosed herein. The system can include a memory including a content library database having a plurality of data packets and a user profile database. The system can further include a server that can: receive aggregation information identifying a set of delivery data packets and a set of assessment data packets; receive data packet data from the content library database; identify a recipient cohort; determine a recipient cohort lapsed time; generate an estimate of data packet transfer time for the aggregation; generate an updated aggregation based on the recipient cohort lapsed time and the estimate of data packet transfer time; and provide the updated aggregation to the user devices.

17 Claims, 9 Drawing Sheets

(52) U.S. Cl.
CPC ............. *H04L 67/42* (2013.01); *H04L 69/28* (2013.01); *Y02D 50/30* (2018.01)

(56) References Cited

U.S. PATENT DOCUMENTS

| | | | | |
|---|---|---|---|---|
| 7,240,235 | B2* | 7/2007 | Lewalski-Brechter | G06F 11/1076 |
| | | | | 709/214 |
| 7,653,739 | B1* | 1/2010 | Kalker ................... | G06Q 10/06 |
| | | | | 709/201 |
| 9,043,433 | B2* | 5/2015 | Backholm ............... | H04W 4/18 |
| | | | | 709/217 |
| 2011/0087877 | A1* | 4/2011 | Dagg ................... | H04L 63/062 |
| | | | | 713/150 |
| 2011/0283355 | A1* | 11/2011 | Livshits ................... | G06F 8/70 |
| | | | | 726/22 |
| 2015/0134694 | A1* | 5/2015 | Burke ................... | G06Q 10/00 |
| | | | | 707/769 |

* cited by examiner

SYSTEM AND METHOD FOR INCREASING DATA TRANSMISSION RATES THROUGH A CONTENT DISTRIBUTION NETWORK WITH CUSTOMIZED AGGREGATIONS

CROSS-REFERENCES TO RELATED APPLICATIONS

This application claims the benefit of U.S. Provisional Application No. 62/073,751, filed on Oct. 31, 2014, the entirety of which is hereby incorporated by reference herein.

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

As the volume of data exchanged between nodes in computer networks has increased, the speed of data transmission has become increasingly more important. Although current technologies provide improved speeds as compared to their predecessors, further developments are needed.

BRIEF SUMMARY

One aspect of the present disclosure relates to a system for increasing data transmission rates through a content distribution network by generating a customized aggregation including data packets selected to maximize a data acceptance rate. The system includes a memory including: a content library database including a plurality of data packets, which plurality of data packets include a plurality of delivery data packets and a plurality of assessment data packets; and a user profile database, which user profile database includes information identifying a cohort of users, and which user profile database includes information identifying a plurality of at least one attribute of each of the users in the cohort of users. The system can include a server that can: receive aggregation information identifying a set of delivery data packets and a set of assessment data packets; receive data packet data from the content library database; identify a recipient cohort, which recipient cohort includes the group of users designated to receive the aggregation via a plurality of user devices; determine a recipient cohort lapsed time, which recipient cohort lapsed time characterizes the amount of time for acceptance of a plurality of previous aggregations by the recipient cohort; generate an estimate of data packet transfer time for the aggregation, which data packet transfer time is the amount of time between the sending of a first data packet in the aggregation and receiving a final response from a user device; generate an updated aggregation based on the recipient cohort lapsed time and the estimate of data packet transfer time; and provide the updated aggregation to the user devices.

In some embodiments, data packet data includes data packet user data and data packet metadata. In some embodiments, the system includes a plurality of user devices connected to the server via a communication network. In some embodiments, the amount of time for the acceptance of a plurality of previous aggregations by the recipient cohort is determined by a timer triggered and stopped by electrical data-carrying signals exchanged between the server and one of the user devices.

In some embodiments, the timer is located in the server, and the exchanged signals include a first signal sent by the server to the user device containing the first data packet in the aggregation and a second signal sent by the user device to the server containing the final response to the aggregation.

In some embodiments, the system includes a plurality of user devices. In some embodiments, each of the user devices includes a timer, and the exchanged signals triggering and stopping the timer in one of the user devices include a first signal received by the user device from the server, which first signal triggers the timer, and which first signal contains the first data packet in the aggregation, and a second signal sent by the user device to the server, which second signal stops the timer, and which second signal contains the final response to the aggregation.

In some embodiments, each of the plurality of user devices can send a time signal indicative of lapsed time measured by the timer. In some embodiments, the time signal is sent when the timer is stopped, and in some embodiments, the time signal is periodically sent after the timer has been triggered and before the timer has been stopped.

In some embodiments, the server can: generate a modeled aggregation outcome, which aggregation outcome includes a prediction of a change in a skill level for the recipient cohort; retrieve a target parameter identifying a desired change to the user skill level for the recipient cohort; generate a modeled aggregation contribution, which aggregation contribution indicates the degree to which the aggregation contributes to reaching the target parameter affected by the estimate of data packet transfer time; generate a modeled alternative contribution, which alternative contribution indicates the degree to which an alternative aggregation contributes to reaching the target parameter affected by an estimate of data packet transfer time for the alternative contribution; and determine the difference between the modeled aggregation contribution and the modeled alternative contribution. In some embodiments, the updated aggregation based on the recipient cohort lapsed time and the estimate of data packet transfer time is generated when the alternative contribution is greater than the modeled aggregation contribution.

One aspect of the present disclosure relates to a method for increasing data transmission rates through a content distribution network by generating a customized aggregation including data packets selected maximize a data acceptance rate. The method includes receiving at a server aggregation information identifying a set of delivery data packets and a set of assessment data packets from a content library database including a plurality of delivery data packets and a plurality of assessment data packets; receiving at the server data packet data from the content library database; retrieving at the server data from a user profile database identifying a recipient cohort, which recipient cohort includes the group of users designated to receive the aggregation via a plurality of user devices; determining with the server a recipient cohort lapsed time from data received from the user profile database, which recipient cohort lapsed time characterizes the amount of time for acceptance of a plurality of previous aggregations by the recipient cohort; generating with the server an estimate of data packet transfer time for the aggregation, which data packet transfer time is the amount of time between the sending of a first data packet in the aggregation and receiving a final response from a user device; generating with the server an updated aggregation based on the recipient cohort lapsed time and the estimate of data packet transfer time; and providing with the server the updated aggregation to the user devices.

In some embodiments, the data packet data includes data packet user data and data packet metadata. In some embodiments, the amount of time for the acceptance of a plurality of previous aggregations by the recipient cohort is determined by a timer triggered and stopped by electrical data-carrying signals exchanged between the server and one of the user devices. In some embodiments, the timer is located in the server, and the exchanged signals include a first signal sent by the server to the user device containing the first data packet in the aggregation and a second signal sent by the user device to the server containing the final response to the aggregation. In some embodiments, the method includes receiving a time signal from the user device indicative of lapsed time measured by the timer located on the user device. In some embodiments, the exchanged signals triggering and stopping the timer in the user device include a first signal received by the user device from the server, which first signal triggers the timer, and which first signal contains the first data packet in the aggregation, and a second signal sent by the user device to the server, which second signal stops the timer, and which second signal contains the final response to the aggregation.

In some embodiments, the time signal is sent when the timer is stopped, and in some embodiments, the time signal is periodically sent after the timer has been triggered and before the timer has been stopped. In some embodiments, the method includes generating a modeled aggregation outcome, which aggregation outcome includes a prediction of a change in a skill level for the recipient cohort; retrieving a target parameter identifying a desired change to the user skill level for the recipient cohort; generating a modeled aggregation contribution, which aggregation contribution indicates the degree to which the aggregation contributes to reaching the target parameter affected by the estimate of data packet transfer time; generating a modeled alternative contribution, which alternative contribution indicates the degree to which an alternative aggregation contributes to reaching the target parameter affected by an estimate of data packet transfer time for the alternative contribution; and determining the difference between the modeled aggregation contribution and the modeled alternative contribution. In some embodiments, the updated aggregation based on the recipient cohort lapsed time and the estimate of data packet transfer time is generated when the alternative contribution is greater than the modeled aggregation contribution.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
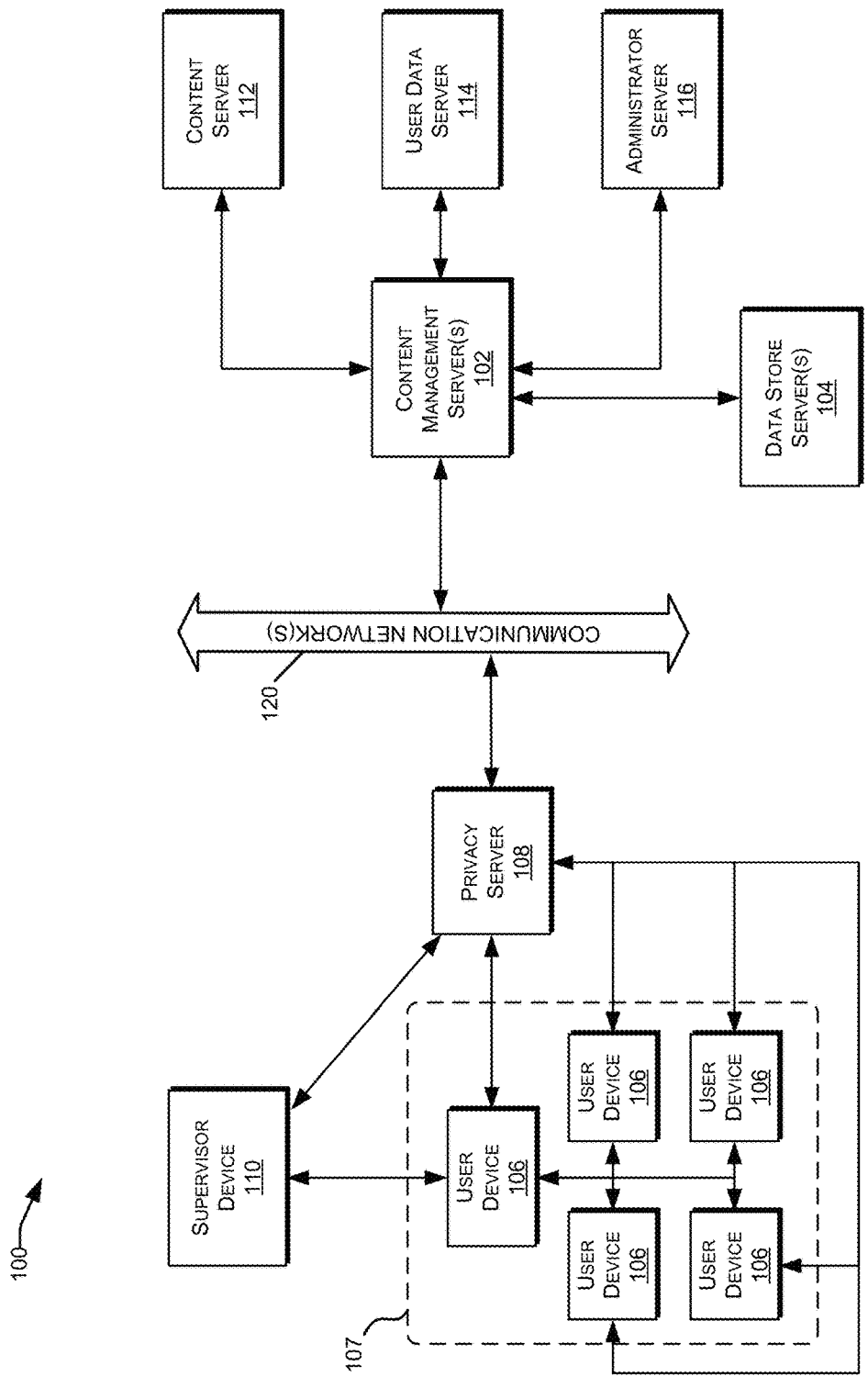
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100, also referred to herein as the prediction system 100, may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

In some embodiments, the content distribution network 100 can include a large number of user devices 106 such as, for example, 100, 500, 1,000, 2,000, 4,000, 6,000, 8,000, 10,000, 50,000, 100,000, 250,000, 1,000,000, 5,000,000, 10,000,000, 100,000,000, 500,000,000 and/or any other or intermediate number of user devices 106. In some embodiments, the large number of user devices 106 can enable the functioning of the content distribution network 100. Specifically, the large number of user devices 106 can allow a large number of students to interact with the content distribution network 100 to thereby generate the data volume to enable performing of the methods and processes discussed at length below. In some embodiments, this volume of data can be so large that it cannot be processed by a human. Such a volume of data is referred to herein as a massive data volume.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
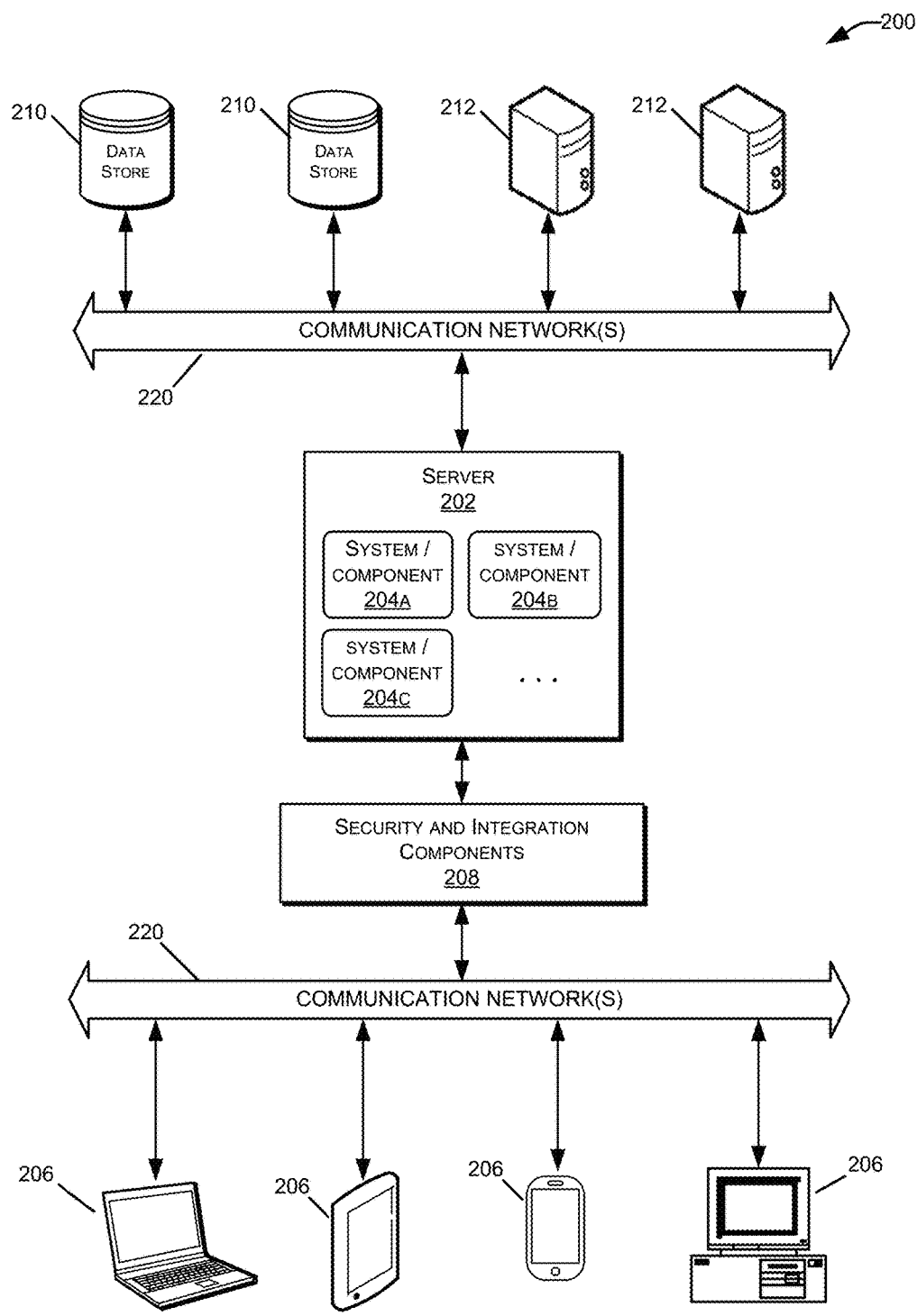
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
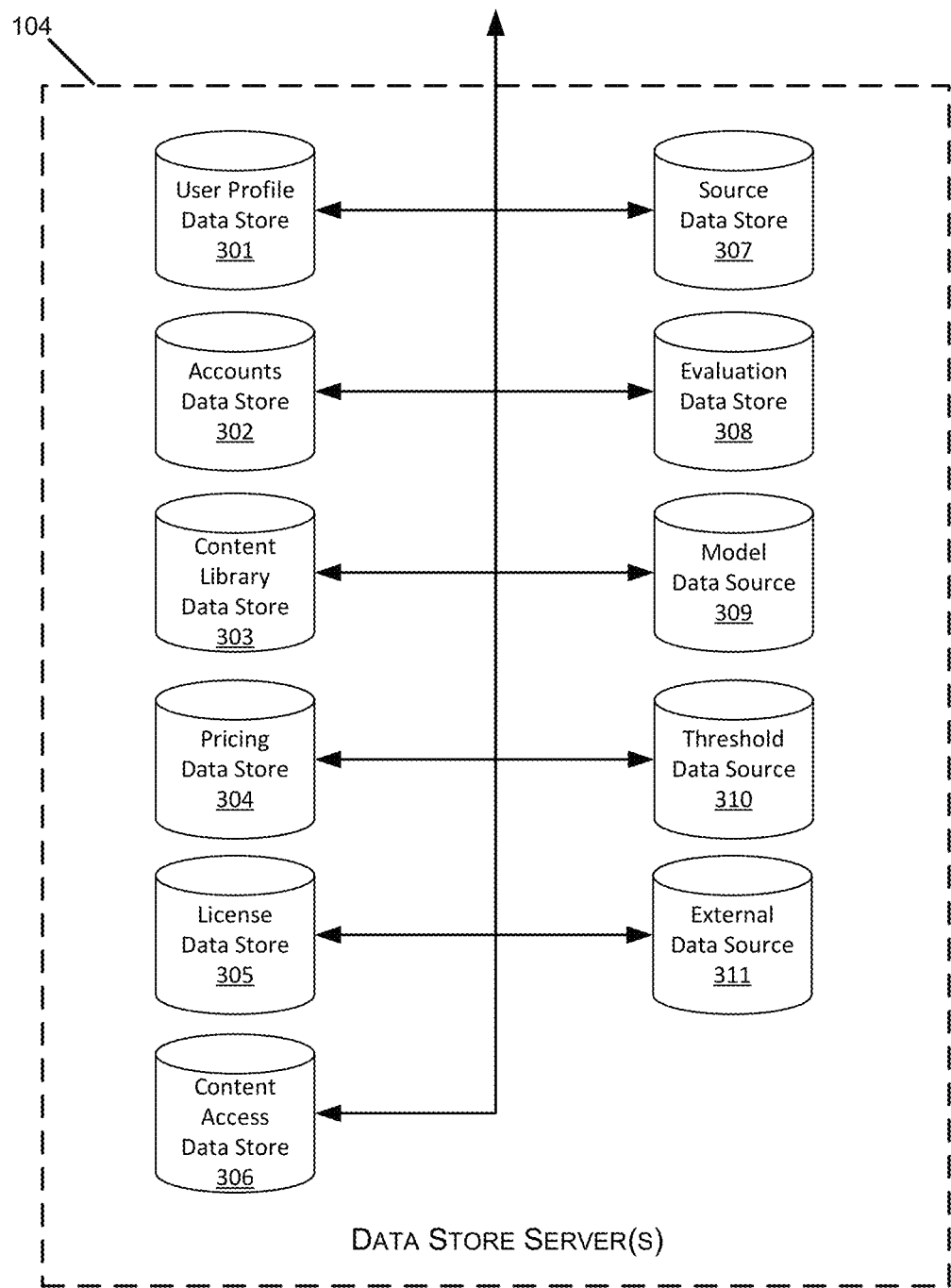
FIG. 3 is a block diagram illustrating an embodiment of one or more data store servers within a content distribution network.

With reference to FIG. 3, an illustrative set of data stores and/or data store servers are shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments in which the one or several end users are individuals, and specifically are students, the user profile database 301 can further include information relating to these students' academic and/or educational history, which academic and/or educational history can be temporally divided and/or temporally dividable. In some embodiments, this academic and/or education history can be temporally divided and/or temporally dividable into recent and non-recent data. In some embodiments, data can be recent when it has been captured and/or generated within the past two years, within the past year, within the past six months, within the past three months, within the past month, within the past two weeks, within the past week, within the past three days, within the past day, within the past 12 hours, within the past six hours, within the past three hours, and/or within any other or intermediate time period.

In some embodiments, the information within the user profile database 301 can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the data in the use profile database 301 can be segregated and/or divided based on one or several attributes of the data such as, for example, the age of the data, the content relating to which the data was collected, or the like. In some embodiments, this data can identify one or several correct or incorrect answers provided by the student, the expected number of correct or incorrect answers provided by the student, student response times, student learning styles, or the like. In some embodiments, the student database can include a data acceptance curve that can define an expected learning trajectory for one or several students based on historic data for those one or several students and, in some embodiments, also based on one or several predictive models. A data acceptance curve for one or several users is referred to herein as a user data acceptance curve. In some embodiments, the user data acceptance curve can comprise a plurality of data acceptance curves calculated for data packets of different difficulties and/or a plurality of data acceptance curves calculated for data packets having different subject matters or skills.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual data packets, also referred to herein as content items or content resources available via the content distribution network 100. As used herein, a data packet is a group of data providable to a user such as, data for teaching a skill or conveying knowledge and/or for assessing a skill or knowledge. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library database 303 can include a plurality of databases such as, for example, a structure database, an aggregate database, a data packet database, also referred to herein as a content item database, which can include a content database and a question database, and a content response database. The content response database can include information used to determine whether a user response to a question was correct or incorrect. In some embodiments, the content response database can further include raw question data including information relating to correct or incorrect responses provided by users and user data associated with some or all of those responses. In some embodiments, this user data can identify one or several attributes of the user such as, for example, any of the user properties discussed above in the user profile database 301. In some embodiments, the content response database can include raw question data including information relating to correct or incorrect responses provided by users and one or several pointers pointing to those users' data in the user profile database 301.

The content item database can include one or several data packets. In some embodiments, the one or several data packets can include, for example, data packets for conveying information to a user, also referred to herein as delivery data packets or delivery content items, and data packets to assess a knowledge level and/or skill level of the user, also referred to as assessment data packets or assessment content items. These data packets can include one or several character strings, text, images, audio, video, or the like. In some embodiments, data packets to convey information to the user can include one or several demonstrations, lectures, readings, lessons, videos or video clips, recordings, audio clips, or the like, and in some embodiments, the data packets to assess a knowledge level and/or skill level of the user can include one or several questions including, for example, one or several short answer questions, essay questions, multiple choice questions, true/false questions, or the like. In some embodiments, the data packets to convey information can be stored in the content database of the data packet database, and in some embodiments, the data packets to assess the knowledge level and/or skill level of the user can be stored in the question database of the data packet database.

In some embodiments, the content item database can include a data acceptance curve that can define an expected learning trajectory for one or several data packets based on historic data for those one or several data packets and, in some embodiments, also based on one or several predictive models. A data acceptance curve for one or several data packets is referred to herein as a data packet acceptance curve. In some embodiments, the data packet acceptance curve can comprise a plurality of data acceptance curves calculated for with data packet user data collected from one or several users. In some embodiments, these one or several user can have different attributes such as different skill levels, different learning styles, or the like.

The aggregate database can include a grouping of data packets including, for example, and grouping of one or both of content items to convey information to a user and content items to assess a knowledge level and/or skill level of the user. This grouping of data packets can be created by a user such as a teacher, instructor, supervisor, or the like. In some embodiments, this grouping of data packets can be created by the user via the supervisor device. In some embodiments, this grouping of data packets can be a lesson that can be given to one or several users.

The structure database can include data identifying a content structure or a knowledge structure that interrelates and interlinks content that can be, for example, stored in others of the databases of, for example, the content library database 303. In some embodiments, for example, the content structure can identify one or several groupings of data packets or grouping categories by which one or several data packets can be identified and/or related. These groupings of data packets can be formed based on the existence or degree of existence of one or several shared attributes among the grouped data packets. In some embodiments, these one or several shared attributes can include, for example, the content of the grouped data packets including one or both of: (1) information is contained in the grouped data packets; and (2) how information is conveyed by the grouped data packets (e.g. text, video, image(s), audio, etc.), a skill or skill level of the grouped data packets, of the like.

In some embodiments, this content can be stored directly in the structure database, and in some embodiments, the structure database can comprise one or several pointers pointing to other databases containing the appropriate content. Thus, in some embodiments, the structure database can contain one or several lessons, one or several questions, and/or one or several answers, some or all of which can be organized and/or connected. In some embodiments, the knowledge database can comprise one or several pointers pointing to one or several lessons in the aggregate database, one or several pointers pointing to one or several data packets that can be, for example, questions, in the data packet database, and/or one or several pointers pointing to one or several responses in the content response database. In some embodiments, and in response to a request from the content management server 102, the pointers in the structure database can be referenced and the desired data can be retrieved from its locations.

In some embodiments, the structure database can further include one or several external content structures. In some embodiments, these external content structures can be pre-existing and can be linked to one or several data packets. In some embodiments, the external content structure can be used to provide an initial organization of the data packets, which initial organization can be altered and/or refined based on information collected from one or several users in response to receipt of one or several of the data packets.

A pricing data store 304, also referred to herein as a pricing database, may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user and the desired level of access (e.g., duration of access, network speed, etc.). Additionally, the pricing data store 304 may include information relating to compilation pricing for groups of content resources, such as group prices and/or price structures for groupings of resources.

A license data store 305, also referred to herein as a license database, may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306, also referred to herein as a content access database, may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307, also referred to herein as a source database, may include information relating to the source of the content resources available via the content distribution network. For example, a source data store 307 may identify the authors and originating devices of content resources, previous pieces of data and/or groups of data originating from the same authors or originating devices, and the like.

An evaluation data store 308, also referred to herein as an evaluation database, may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database, can store information relating to one or several predictive models. The predictive models can include, for example, a Rasch model, an item response model, a Performance Factor Analysis model, Knowledge Tracing, one or several statistical models, including, for example, one or several normal models, or the like. In some embodiments, the predictive models can be generally applicable to any user of the content distribution network 100 or components thereof, or to content stored in the content distribution network 100. In some embodiments, the predictive models can be customized for one or several selected user and/or selected content.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
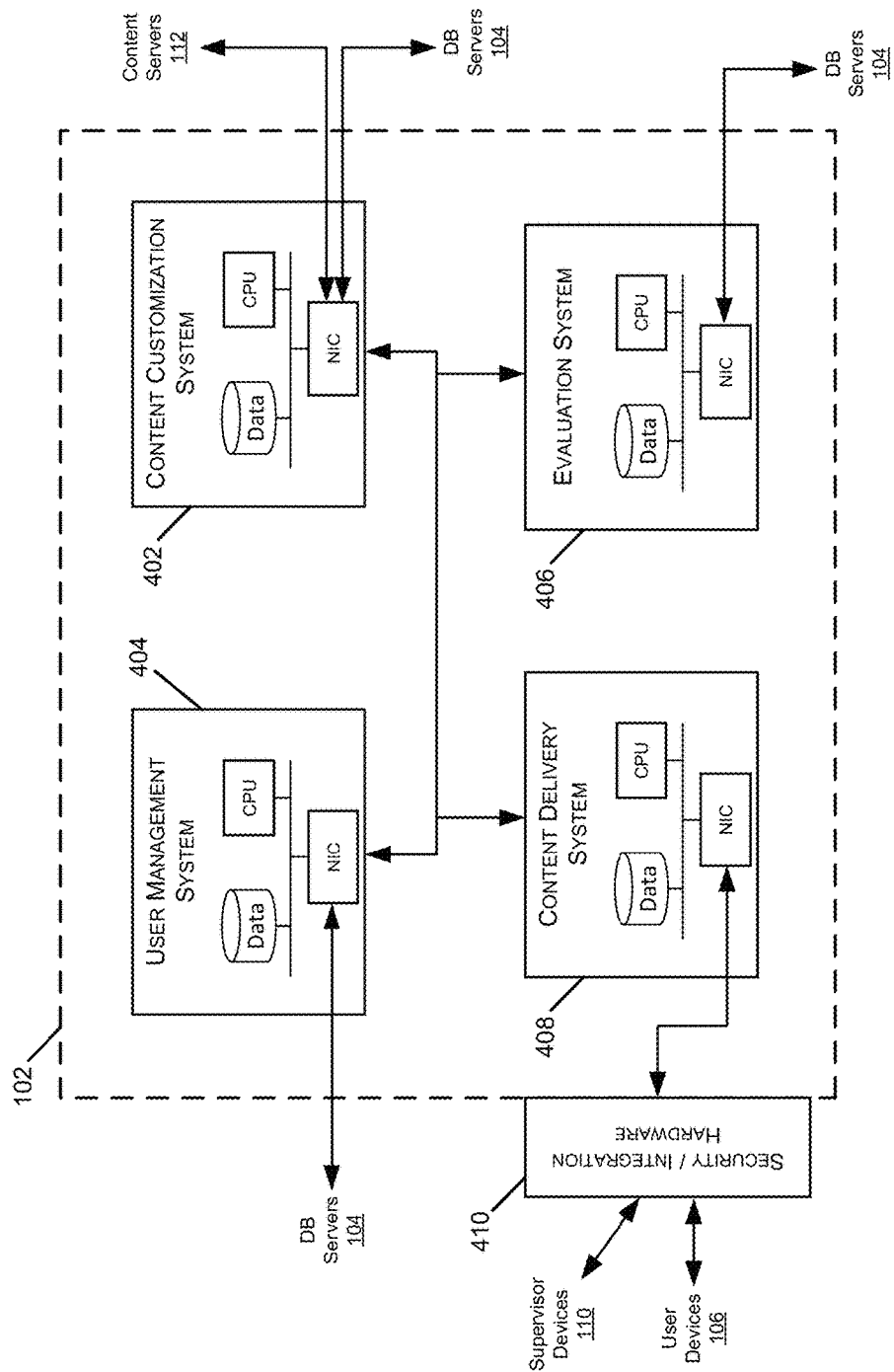
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
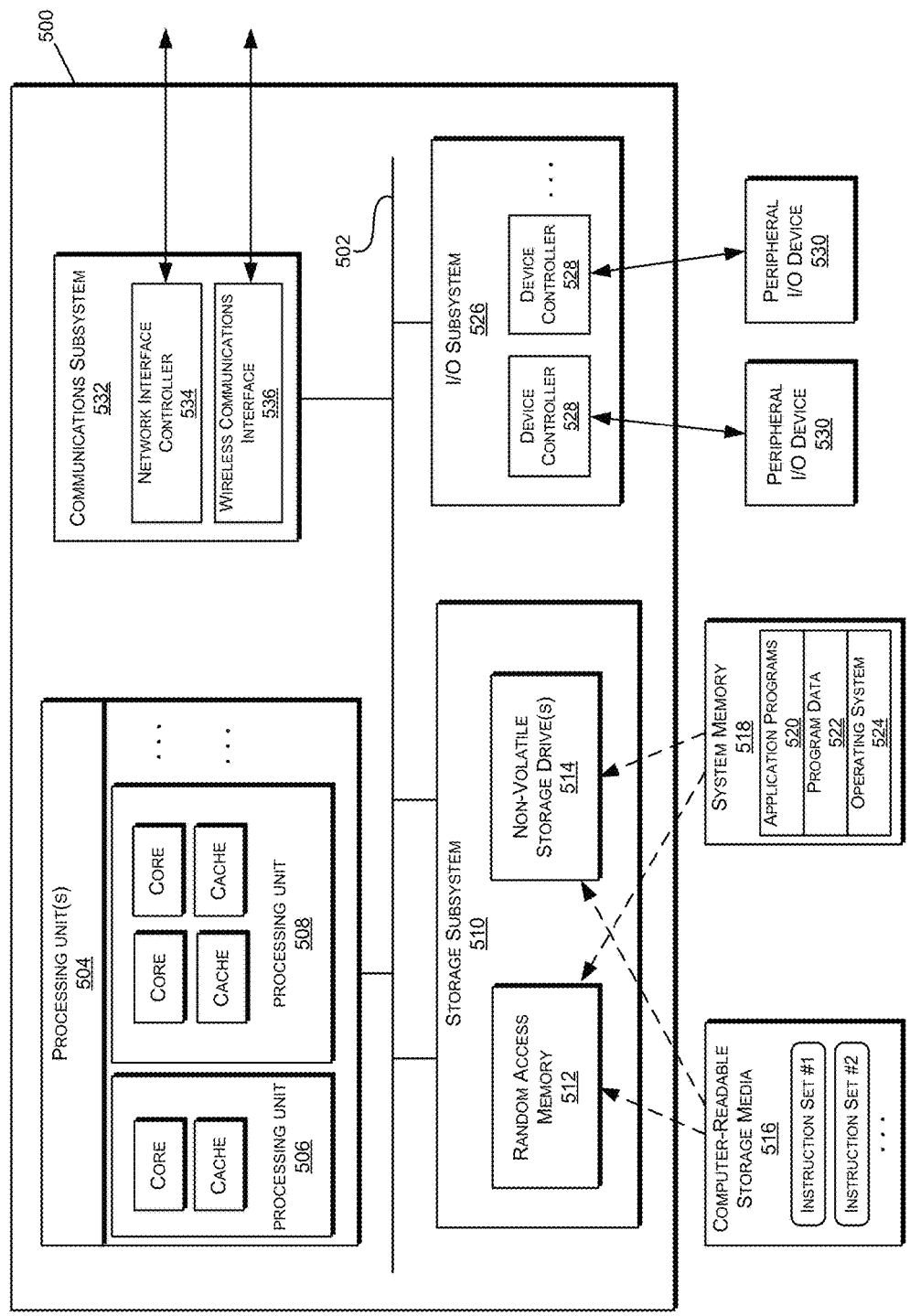
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
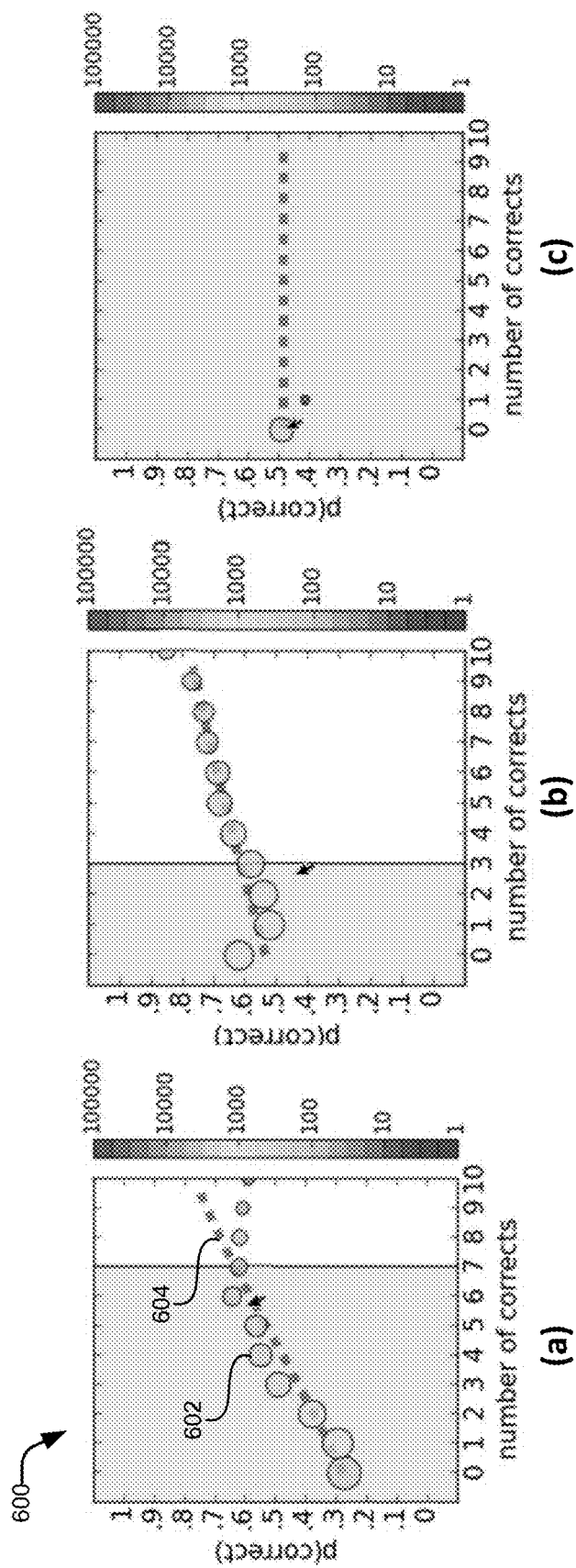
FIG. 6 contains a plurality of images of data acceptance curves.

With reference now to FIG. 6, exemplary images of data acceptance curves 600 which can be either user data acceptance curves or data packet acceptance curves. Each of these images includes an axis labeled a "p(correct)" which identifies a percent of time that a desired response is received for a next provided data packet. Each of these images also includes an axis labeled "number of corrects" which identifies the number of desired responses provided to a category or group of data packets. Each of the images further include indicators 602 that identify aggregated data for one or several users and a trend-line 604 depicting expected user progress based on the some or all of the data represented by the indicators 602.

In some embodiments, a data acceptance curve 600 can be generated for one or several users. In such an embodiment, the data acceptance curve 600 can be based on the interactions of these one or several users with the content distribution network 100, and particularly based on the responses provided by these one or several users to assessment data packets provided by the content distribution network 100. This user data acceptance curve can identify how these one or several users accept data which can include, for example, develop a new skill or skill set, master or learn subject matter, or the like. In such an embodiment, one or several users who have a higher data acceptance rate are indicated by a relatively steeper slope of the trend-line 604 than one or several users with a lower data acceptance rate.

In some embodiments, a data acceptance curve 600 can be generated for one or several data packets. Such content item data acceptance curves can be stored in the content library database 303. In such an embodiment, the data acceptance curve 600 can identify the acceptance of the data of the one or several data packets, particularly vis-à-vis the current grouping of the one or several data packets. This acceptance curve can thus depict the relationship between exposure to related data packets and the likelihood of providing a desired response to the one or several data packets for which the data acceptance curve 600 is created.

The data acceptance curve 600 can be generated with data for one or several users and can be, for example, associated in one of the databases with those one or several users or with one or several data packets. In such an embodiment, the data acceptance curve can provide information relating to an expected outcome for one or several users as the one or several users provide additional desired responses. In such embodiments, the slope of the trend-line 604 can provide an indicator of this expected progress, and specifically, a steep, positive trend-line 604 indicates that a user has historically progressed and/or processed data packets more rapidly than a relatively less steep, positive trend-line 604.

In some embodiments, the data acceptance curves 600 can further provide an indicator between the correlation between data packets, and specifically between one or both of a plurality of assessment data packets and one or several delivery data packets. In some embodiments, for example, a relatively less positively sloped trend-line can indicate a weaker correlation between one or several topics, subjects, and/or skills of a plurality of data packets.

Accordingly, and referring to images (a), (b), and (c) of FIG. 6, image (a) indicates a relatively stronger correlation between the provided data packets associated with the response data represented in image (a) than the correlation of either images (b) and (c), and image (a) likewise indicates that the one or several users associated with the response data represented in image (a) process data faster than those users of images (b) and (c). Similarly, image (c) indicates a relatively weaker correlation between the provided data packets associated with the response data represented in image (c) than the correlation of either images (a) and (b), and image (c) likewise indicates that the one or several users associated with the response data represented in image (c) process data slower than those users of images (a) and (b).

Figure 7:
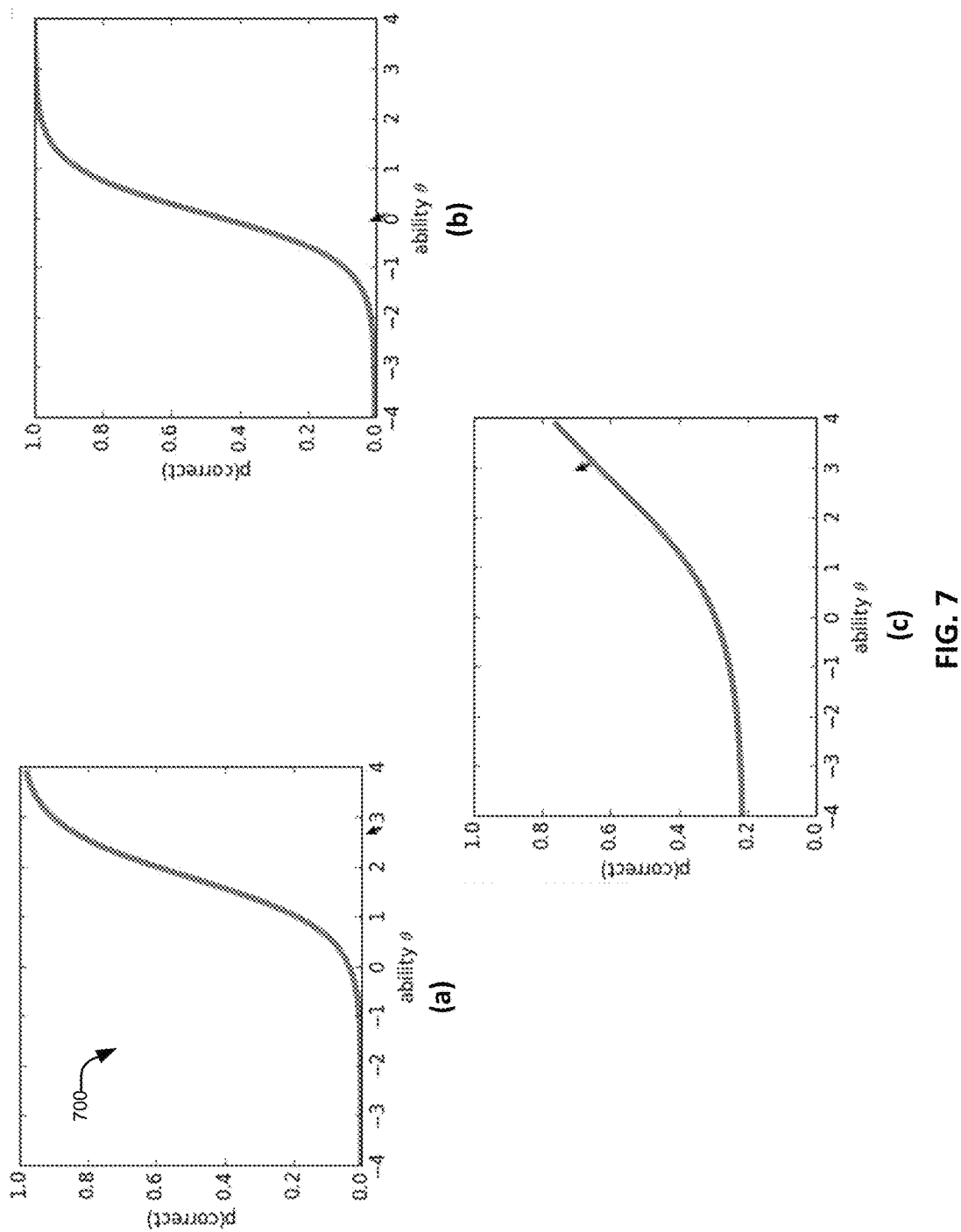
FIG. 7 contains a plurality of images of data packet curves.

With reference now to FIG. 7, a plurality of images of data packet curves 700, also referred to herein as content item curves 700, are shown. The data packets curves can be stored in the content library database 303 and can be, for example, associated with the data packet(s) for which they were created. Each of the images of content item curves in FIG. 7 includes an axis labeled a "p(correct)" which identifies a probability of receiving a desired response to the data packet for which the data packet curve 700 is created. Each of these images further includes an axis labeled "ability θ" that identifies a skill level of one or several users who have responded to the data packet associated with the content item curve 700.

In some embodiments, the data packet curve 700 can include information identifying one or several properties of the data packet including, for example, the difficulty of the data packet, the differentiation of the data packet, and a randomness measure or randomness parameter of the data packet.

In some embodiments, the difficulty of the data packet correlates to the probability of a user providing a desired response to the data packet. Thus, a user, regardless of skill level, will have a lower likelihood of providing the desired response to a first data packet that has a higher difficulty than the likelihood of that user providing the desired response to a second, relatively easier data packet. In some embodiments, the placement of the data packet along the axis labeled "ability θ" indicates the difficulty of the data packet, the width of the curve such indicates the differentiation of the data packet, and the absolute minimum of the data packet curve 700 indicates the randomness measure of the data packet. Thus, the data packet associated with image (a) is more difficult than the data packet associated with image (b).

In some embodiments, the differentiation of a content item describes the degree to which correct and incorrect responses to a data packet distinguish between skill levels. Thus, a data packet having a greater level of differentiation will, across a data set, better distinguish between user skill levels than a data packet having a lower level of differentiation. In some embodiments, the differentiation of a data packet is indicated by the range of ability levels corresponding to non-asymptotic portion of the data packet curve 700, or more generally, by the width of the non-asymptotic portion of the data packet curve 700. Accordingly, both the data packets associated with images (a) and (b) have approximately equal levels of differentiation.

The randomness measure of the data packet characterizes the likelihood of randomly receiving the desired response from a user to that data packet. This randomness can be indicated by a vertical displacement of the data packet curve 700 along the axis labeled "p(correct)." Accordingly, the data packet associated with image (c) is more greatly affected by randomness than the data packets associated with (a) and (b) as a user has a greater than 20 percent chance of providing the desired response, regardless of ability, to the data packet associated with image (c).

Figure 8:
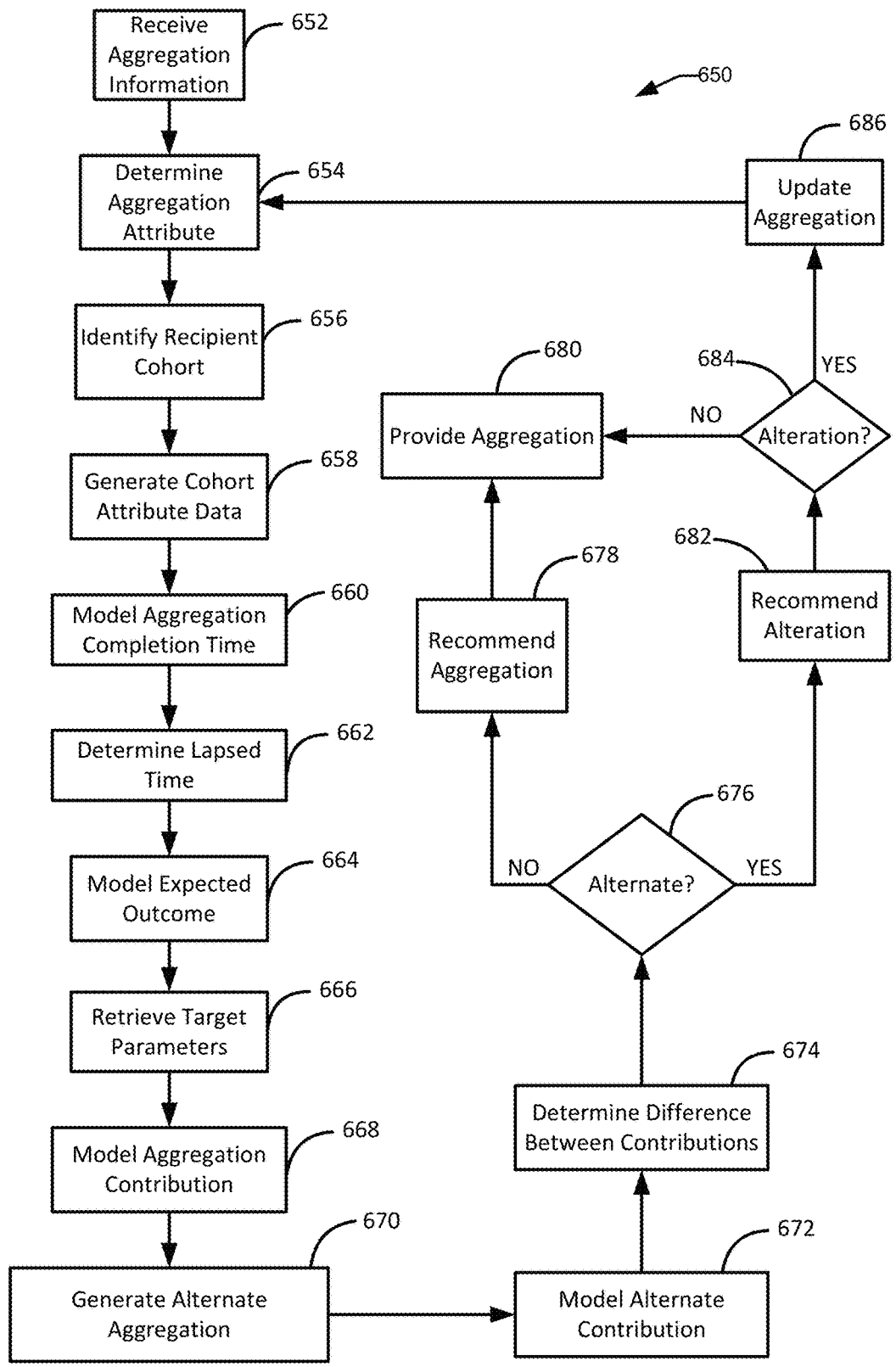
FIG. 8 is a flowchart illustrating one embodiment of a process for generating a customized aggregation recommendation to maximize data transmission rates through the content distribution network.

With reference now to FIG. 8, a flowchart illustrating one embodiment of a process 650 for generating a customized aggregation recommendation to maximize data transmission rates through the content distribution network 100 is shown. The process 650 can be performed by the content distribution network 100 and/or one or several components thereof. The process 650 begins at block 652 wherein aggregation information is received.

In some embodiments, the aggregation information can identify one or several data packets, including one or several delivery data packets and/or one or several assessment data packets, for intended delivery to one or several users, which users can be, for example, one or several students, via, for example, one or several user devices 106.

The aggregation information can be generated by the content delivery network 100 or can be received from a user-supervisor such as a teacher, and instructor, or any individual, group, or entity responsible for providing content to one or several other users. In some embodiments, the aggregation information can be received from the user-supervisor via one or several supervisor devices 110 and one or several communication networks 120.

In some embodiments in which the aggregation information is generated by the content delivery network 100, the content delivery network can receive one or several parameters from the user-supervisor. These parameters can, for example, specify one or several attributes of the desired aggregation of data packets for providing to one or several users. These attributes can specify, for example, a difficulty level, a differentiation level, a time parameter which can include, for example, the maximum or average duration for user data acceptance, a subject matter parameter which can identify one or several topics, skills, or the like for inclusion the aggregation, or the like. In some embodiments, these attributes can be applied to either or both of the aggregation as a whole or to some or all of the individual data packets forming the aggregation.

In some embodiments, these attributes can be received from the supervisor device 110 via one or several communications networks 120. In one particular embodiment, the supervisor device 110 can include a graphical user interface (GUI) including features enabling user inputs indicative of these attributes. In one embodiment, for example, the GUI can include a plurality of sliders each of which corresponds to an attribute. By varying the position of a sliding element along the length of the slider, the user-supervisor can adjust attribute levels.

After user inputs indicative of these attributes have been received, the content delivery network 100 or its components can identify one or several data packets that either alone or in combination correspond to the specified attributes. Information relating to these one or several data packets can be collected and stored in one of the databases such as, for example, the content library database 303, and these one or several data packets can be identified as the aggregation.

In some embodiments, receipt of the aggregation information can further include the retrieval and/or receipt of the one or several data packets identified by the aggregation information. In some embodiments, these one or several data packets can be retrieved or received from one of the databases such as the content library database 303 by for example, the central processor 102 of the content delivery network 100.

In some embodiments, the receipt of the aggregation information can further include the retrieval and/or receipt of the data packet metadata for the retrieved data packets. In some embodiments, the data packet metadata can relate to and/or identify one or several aspects of the content of the data packet. In contrast to the data packet user data, the data packet metadata does not change based on user interactions with the content delivery network 100, and specifically does not change based on user responses to provided data packets. The data packet metadata can be retrieved and/or received from the content library database 303.

In some embodiments, the receipt of the aggregation information can further include the retrieval and/or receipt of the data packet user data. wherein the data packet user data is retrieved. The data packet user data can include data associated with each of the data packets, which is based on one or several user interactions with the content delivery network 100, and specifically which is based on one or several user responses provided to one or several assessment data packets. In some embodiments, the data packet user data can be retrieved simultaneous with the retrieval of the data packets, and can be retrieved from the content library database 303.

After the aggregation information has been received, the process 650 proceeds to block 654, wherein an aggregation attribute is determined by, for example, generating the combined aggregation data. In some embodiments, the combined aggregation data can be generated from one or both of the data packet metadata and the data packet user data. This combined aggregation data can characterize an attribute of the aggregation as a whole such as, for example, the difficulty of the aggregation as a whole, the differentiation of the aggregation as a whole, the anticipated time required for the aggregation as a whole, or the like. In some embodiments, this combined aggregation data can be generated by identifying and combining like attributes from the data packets in the aggregation according to known techniques.

After the aggregation attribute has been determined, the process 650 proceeds to block 656, wherein a recipient cohort is identified. In some embodiments, the recipient cohort is the group of users designated to receive the aggregation. The recipient cohort can be determined based on information received from the user-supervisor and/or based on user information stored in, for example, the user profile database 301. In one embodiment, for example, the recipient cohort can correspond to users participating in a group such as, for example, the class, a program, the training group, or the like. In some embodiments, the recipient cohort can be identified by determining the group for receiving the aggregation and then determining the users in that group. In one embodiment, for example, the user-supervisor can designate a class for receiving the aggregation and the users in that class can be identified based on, for example, enrollment information stored in the user profile database 301.

After the recipient cohort has been identified, the process 650 proceeds to block 658 wherein combined cohort data is generated. In some embodiments, this can include the retrieval and/or receipt of recipient cohort user data. In some embodiments, this recipient cohort user data can be received or retrieved from the user profile database 301. This information can identify one or several attributes of the user and/or can identify one or several user actions. These attributes can include, for example, the data acceptance rate, a skill level, a learning style, or the like. The one or several user actions can include, for example, information identifying one or several data packets received by the user, information identifying one or several responses provided by the user including identifying one or several desired responses or undesired responses provided by the user, amount of time spent interacting with the content distribution network 100, amount of time spent receiving and/or responding to data packets, or the like. In some embodiments, this can include receiving, and/or retrieval of one or several data acceptance curves associated with one or several of the users in the recipient cohort.

In some embodiments, the combined cohort data can be generated from the received cohort user data. This combined cohort data can characterize an attribute of the cohort as a whole such as, for example, the data acceptance rate, the skill level, lapsed time including the time already spent by users and the recipient cohort receiving and/or responding to data packets, or the like. In some embodiments, this combined cohort data can be generated by identifying and combining the like attributes from users and the cohort according to known techniques.

After the combined cohort data has been generated, the process 650 can proceed to block 660, wherein the aggregation completion time is modeled. In some embodiments, the model or aggregation completion time can comprise an estimate of the amount of time for the recipient cohort to complete the aggregation. In some embodiments, this aggregation completion time can be calculated by generating an estimated completion time for each user of the recipient cohort and combining those times together into a single aggregation completion time via, for example, a sum or an average. In some embodiments, the aggregation completion time can be calculated based on the calculated aggregation attributes. In such an embodiments, the estimated completion time can be calculated based on the aggregation attributes. In some embodiments, the estimate of the completion time for the aggregation can be determined by a combination of the aggregation difficulty and the user skill level, one or several data acceptance curves of one or several students, of one or several content items in the aggregation, and/or of the aggregation. In some embodiments, for example, the user skill level can include information relating to, for example, the average time used in completing all of portions of an aggregation based on the difficulty of the aggregation. Alternatively, based on user information such as the user skill level and the aggregation difficulty, a predictive model can be used to generate predictions of time used to complete all or portions of an aggregation. In some embodiments, the aggregation completion time is the amount of time between the sending of a first data packet in the aggregation and receiving a final response from a user device.

After the aggregation completion time has been modeled, the process 650 proceeds to block 662, wherein the lapsed time is determined. As referred to herein, the lapsed time refers to the amount of time spent by users in the recipient cohort of the aggregation performing one or several other aggregations in a time period. In some embodiments, the lapsed time can be specific to a subject matter, a group of users, or the like. The lapsed time can be determined for individual users and can then be determined for the cohort of recipients of the aggregation. The lapsed time can be determined from user data.

In some embodiments, this lapsed time can be determined by identifying a window in which the lapsed time is to be calculated. In some embodiments, this window can be defined by a user input such as, for example, an input from a user-supervisor via a supervisor device 110. After the window has been determined, one or several relevant users are identified. In some embodiments, these one or several relevant users can be the users in the recipient cohort. After the users have been identified, the amount of completion time for aggregations started or completed in the window by the identified users is determined. In some embodiments, this determination can include the selection of one of the identified users, the querying of the user profile database for information identifying the amount of time spent by the user starting and/or completing one or several aggregations in the window, and generating a sum or average of that time. In some embodiments, this can be repeated for all identified users, and the times for each of the users can be combined into a single value indicative of the lapsed time for the entire recipient cohort via, for example, a sum or an average.

In some embodiments, the lapsed time can be calculated based on information received from one or several timers. These one or several timers can be in hardware or in software and can be located in the user devices 106 and/or in the central server 102. In some embodiments, a timer can be uniquely associated with a user and can be triggered to measure the amount of time spent by a user in the completion of an aggregation. In some embodiments, this timer can be triggered and stopped by one or several electrical data-carrying signals exchanged between the server 102 and this user device 106.

In some embodiments, these signals can include a first signal sent by the server 102 to the user device 106. This first signal can contain and/or include a first data packet of the aggregation. These signals can further include a second signal sent by the user device 106 to the server 102 containing a final response to the aggregation. In some embodiments in which the timer is located in the user device 106, these signals triggering and stopping the timer in one of the user devices 106 can include a first signal received by the user device 106 from the server 102. In some embodiments, this first signal can trigger and/or start the timer, and this first signal can contain the first data packet in the aggregation. In some embodiments, these signals triggering and stopping the timer can include a second signal sent by the user device 106 to the server 102. In some embodiments, the second signal stops the timer, and the second signal contains the final response to the aggregation.

In some embodiments in which the user devices 106 include times, the timers can send information indicative of the lapsed time for one or several aggregations to one or several other components of the content distribution network 100 such as, for example, the central server 102 and/or the database servers 104. In some embodiments, this information indicative of the lapsed time can be sent by one of the timers when the timer is stopped at, for example, the conclusion of the aggregation and concurrent with the sending of the second signal. In some embodiments, the timer can periodically send time signals to the other components of the content distribution network 100 after the timer has been triggered and before the timer has been stopped.

After the lapsed time has been determined, the process 650 proceeds to block 664, wherein expected outcome of the aggregation is modeled. In some embodiments, the expected aggregation outcome is the expected resulting change in one or several user attributes of the recipient cohort and/or the expected resulting change in the recipient cohort attributes. This can include, for example, a change in the skill level, a change in the data acceptance curve, or the like. This expected progress can be determined based on one or several learning curves retrieved from the profile database. In one embodiment, for example, the current skill level of one or several users can be determined, and the data acceptance curves for these one or several users can be retrieved. Based on the current skill level of the users, and the aggregation attributes, the data acceptance curves of these users can be matched to the current aggregation. Specifically, in one embodiment, the likelihood of a user providing a desired response to a data packet of a skill level matching the aggregation can be determined, and the corresponding location on the user's data acceptance curve can be identified. The number of content items in the aggregation can be determined and can be applied to the user's data acceptance curve to identify a likely skill end point after the completion of the aggregation. This likely skill end point is the expected aggregation outcome for the student associated with the used data acceptance curve.

After the expected aggregation outcome has been modeled, the process 650 proceeds to block 666 wherein one or several target parameters are retrieved. In some embodiments, the one or several target parameters identify one or several desired outcomes to be achieved in a period of time including in either a period of time spent completing one or several aggregations or in an aggregation independent period of time such as, for example, one week, one month, two months, one quarter, one semester, one year, or the like. In some embodiments, these target parameters can further identify progress towards achieving those one or several desired outcomes, identify rate of progress towards achieving those one or several desired outcomes, and whether and/or to what degree the achievement of those one or several desired outcomes is expected. In some embodiments, these one or several goal parameters can be retrieved from the user profile database 301.

After the one or several goal parameters have been retrieved, the process 650 proceeds to block 668 wherein the aggregation contribution is modeled, and specifically, an aggregation contribution value is generated. The aggregation contribution can, in some embodiments, identify the contribution of the expected achievement from completion of the aggregation to the achievement of the one or several target parameters. In some embodiments, this aggregation contribution value can be calculated based on one or several of the learning curves and/or one or several of the predictive models. In some embodiments, the aggregation contribution value can further include one or several time related attributes including, for example, a weighting of the expected outcome of the aggregation according to the time resources required to complete the aggregation to achieve the expected outcome. In some embodiments, for example, an aggregation contribution value can be inversely related to the amount of time required to complete an aggregation to achieve that outcome.

After the aggregation contribution has been modeled, the process 650 proceeds to block 670, wherein an alternate aggregation is generated. In some embodiments, this alternate aggregation can include more or fewer data packets than included in the standing aggregation, or in other words, than included in the non-alternate aggregation. In some embodiments, for example, the alternate aggregation can replace one or several data packets in the standing aggregation with other data packets selected from an aggregation database, which aggregation database can include all of the data packets useable in an aggregation. In some embodiments, these data packets can be selected for inclusion in the aggregation database based on one or several user-specified parameters of the aggregation. In some embodiments, these one or several other data packets can have the same, or approximately the same attributes as the data packets they are replacing, but may, for example, require less time, have relatively data acceptance rates, or the like.

After the alternate aggregation has been generated, the process 650 proceeds to block 672, wherein an alternate aggregation contribution is modeled, and specifically, an alternate aggregation value is generated. This alternate aggregation contribution can be the same as the model aggregation contribution, except calculated for the alternate aggregation. Thus, this alternate contribution can be calculated in accordance with the discussion of block 668.

After the alternate contribution has been calculated, the process 650 proceeds to block 674, wherein the difference between the aggregation contribution and the alternate aggregation contribution is determined. In some embodiments, this can include determining which of the aggregation contribution value and the alternate aggregation contribution value is larger. Moving to decision block 676, if it is determined that the contribution value is larger than the alternate contribution value, then the process 650 proceeds to block 678, and the aggregation is recommended to, for example, the user-supervisor via the supervisor device 110. After the aggregation has been recommended, the process 650 can proceeds to block 680, and the aggregation can be provided to the user via the user device 106.

Returning again to decision state 676, if it is determined that the alternate contribution value is larger than the aggregate contribution value, then the process 650 proceeds to block 682, wherein an alteration to the aggregation is recommended, and specifically, wherein the alternate aggregation is recommended. In some embodiments, this recommendation can be provided to the user-supervisor via a communication from the server 102 to the supervisor device 110 via the communication network.

In some embodiments, the recommendation can be provided in the form of an alert. The alert can be generated by the central server 102 and/or the privacy server 108 and can be provided to at least one of the user devices 106 and/or the supervisor device 110. In some embodiments, an alert, containing information relevant to the recommended alteration can be provided to the user-supervisor along with a prompt to indicate whether the recommended alteration is accepted or refused.

In some embodiments, any information disclosed herein as provided to one or several user devices 106 and/or supervisor devices 110 can be provided in a form of an alert. In some embodiments, for example, the providing of this alert can include the identification of one or several user device 106 and/or user accounts associated with the user. After these one or several user devices 106 and/or user accounts have been identified, the providing of this alert can include determining a use location of the user based on determining if the user is actively using one of the identified user devices 106 and/or accounts. In some embodiments, the use location may correspond to a physical location of the device 106, 110 being actively used, and in some embodiments, the use location can comprise the user account and/or user device which the creator of the thread is currently using.

If the user is actively using one of the user devices and/or accounts, the alert can be provided to the user via that user device 106 and/or account that is actively being used. If the user is not actively using a user device 106 and/or account, a default device, such as a smart phone or tablet, can be identified and the alert can be provided to this default device. In some embodiments, the alert can include code to direct the default device to provide an indicator of the received alert such as, for example, an aural, tactile, or visual indicator of receipt of the alert.

After the recommendation is provided, a user response can be received from the supervisor device 110. If the recommended alteration is rejected, then the process proceeds to block 680 and the aggregation is provided to the users of the recipient cohort via their user devices 106. If the alteration is accepted, then the process 650 proceeds to block 686, wherein the aggregation is updated according to the alteration, and/or wherein the standing aggregation is replaced with the alternate aggregation. The process 650 then proceeds to block 654 and proceeds as outlined above.

Figure 9:
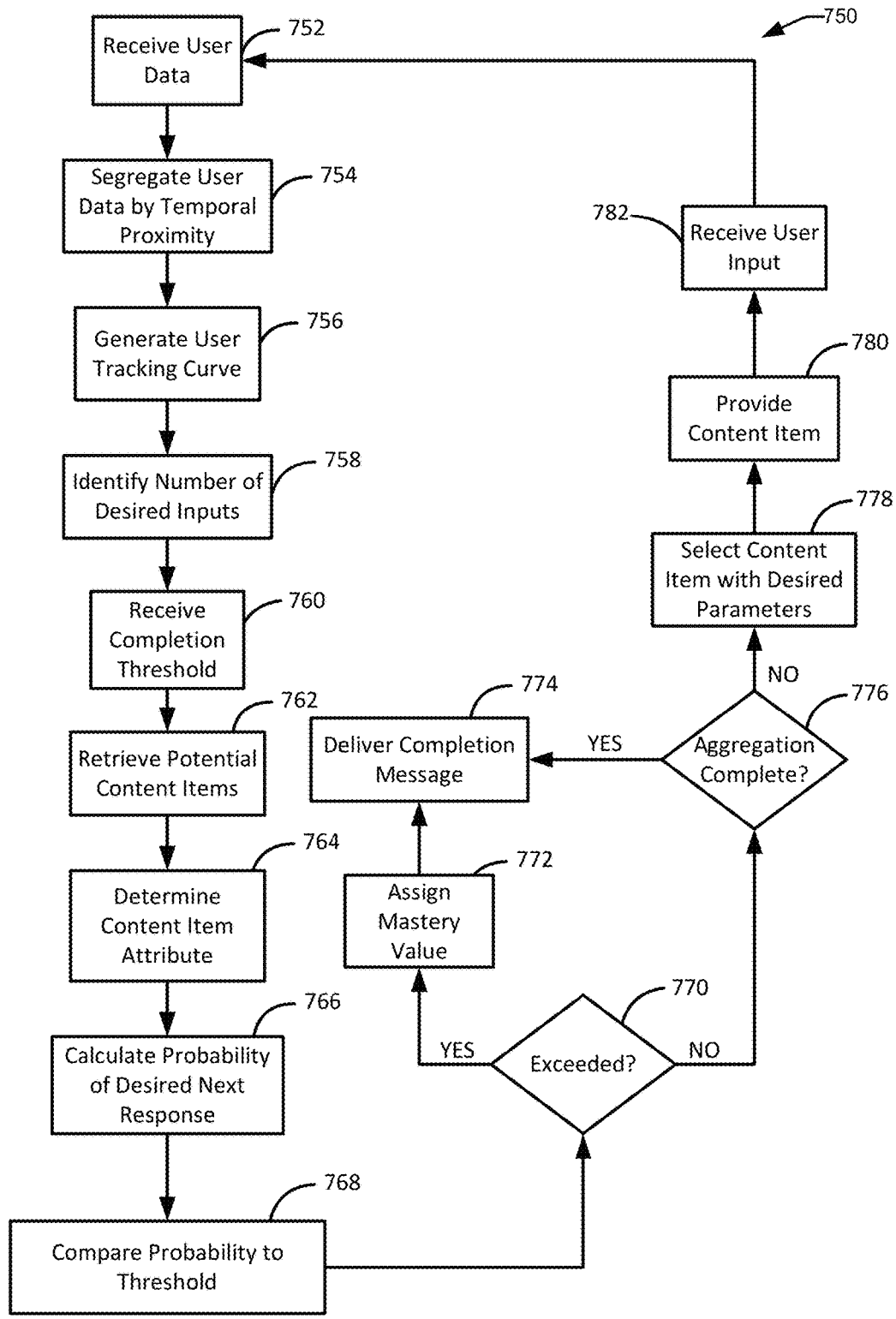
FIG. 9 is a flowchart illustrating one embodiment of a process for determining termination of an aggregation.

With reference now to FIG. 9, a flowchart illustrating one embodiment of a process 750 for determining termination of an aggregation is shown. The process 750 can be performed by the content delivery network 100 and/or one or several components thereof. The process 750 begins at block 752, wherein user is retrieved. In some embodiments, this step can be performed for users who are about to start an aggregation or who are currently receiving content items for an aggregation. In some embodiments the user data that is retrieved can be information relating to users who are potential recipients of a next data packet, and specifically a next assessment data packet. These users can include, for example, students in a class, a program, or the like. This user data can relate to one or several of a user skill level, a user's data acceptance rate, a user speed level, or the like. In some embodiments, this user information can be retrieved from the user profile database 301.

In some embodiments, this user data can be segregated and/or divided based on one or several attributes of the data such as, for example, the age of the data, the content relating to which the data was collected, or the like, and specifically, this data can be segregated into multiple groups, including a first group relating to recent student performance, and particularly relating to recent student performance with respect to a certain type and/or subject of content, and a second group relating to older performances by the student.

After the user data has retrieved, the process 750 proceeds to block 754, wherein the user data relating to recent user performance with respect to the subject of the next data packet is divided from relatively older information. In other words, user data is divided based on temporal proximity. In some embodiments, the "recent" information can be information gathered in the past 10 minutes, 1 hour, 2 hours, 3 hours, 5 hours, 10 hours, 24 hours, 4 days, 1 week, 1 month, 1 year, 1 quarter, 1 semester, or the like. Similarly, relatively older information can be information gathered outside of the term in which the recent information was gathered.

After the user data is divided, the process 750 proceeds to block 756, wherein a data acceptance curve is calculated. In some embodiments, the data acceptance curve can be calculated based on the user data and can be, for example, a curve fit to the historic user data. In some embodiments, the user data acceptance curve can be generated in accordance to the discussion above with respect to FIG. 6.

In some embodiments, the data acceptance curve can be calculated according to one or several of the predictive models. In some embodiments, the data acceptance curve can be pre-calculated, and can be retrieved from one of the databases such as, for example, the user profile database 301.

After the data acceptance curve has been calculated, the process 750 proceeds to block 758, wherein the number of desired inputs and/or desired responses provided by the user is determined. In some embodiments, these can be the number of desired responses answers provided to assessment content items within a specified time frame, such as, for example, the time frame for determining if information is "recent," and/or response provided that relates to one or several desired topics and/or subjects. In some embodiments, one or both of the server 102 and the user devices 106 can include a counter maintaining a count that can be incremented when a desired response is provided. In some embodiments, determining the number of desired inputs can include querying the counter for the number of desired inputs, and receiving a response to the query from counter, which response identifies the count.

After the number of desired inputs are determined, the process 750 proceeds to block 760, wherein a completion threshold is retrieved. In some embodiments, the completion threshold can define a value that delineates between a circumstance in which a user has mastered a subject and/or skill, and thus has achieved a desired level of data acceptance, from a circumstance in which a student has not mastered a subject and/or skill, and thus has not achieved a desired level of data acceptance. In some embodiments, the threshold value can be retrieved from the database server 104, and particularly from the threshold database 310.

After the completion threshold has been retrieved, the process 750 proceeds to block 762, wherein the remaining possible data packets, and particularly assessment data packets are retrieved. In some embodiments, these data packets can be retrieved from one of the databases such as, for example, the question database or the aggregation database. In some embodiments, these questions can be remaining questions in that they are related to a specific subject, skill, and/or topic, and have not yet been provided to the user.

After the remaining data packets have been retrieved, the process 750 proceeds to block 764, wherein one or several attributes of the remaining data packets are identified. In some embodiments, these attributes can include, for example, differentiation, difficulty, or the like. In some embodiments, the difficulty can describe the likelihood that users at one or several skill levels will provide the desired response to the data packet. In some embodiments, these attributes can be determined by retrieving information identifying these attributes from, for example, the content library database 303.

After the content item attributes have been determined, the process 750 proceeds to block 766, wherein a value indicating the likelihood of a desired next response is calculated. In some embodiments, this value can be calculated for a generic assessment data packet that can have, for example, an average difficulty, a greater than average difficulty, or a less than average difficulty. In some embodiments, this value indicating the likelihood of the desired next response can be calculated for one or several specific data packets. This value can be calculated using the data acceptance curves and/or one or several predictive models as well as the user information and the data packet information. This value can be additionally based on, for example, the number of desired responses that the student has provided, and/or the number of desired responses provided without any intervening undesired responses.

After the likelihood of the desired next response has been calculated, the process 750 proceeds to block 768, wherein the likelihood of the desired next response is compared to the completion threshold. In some embodiments, this comparison can determine whether the user has reached a level of mastery of a skill and/or piece of knowledge, indicated by the likelihood of a desired next response, such that the user can end the aggregation and/or practice relating to that skill and/or piece of knowledge. In some embodiments, this comparison can be performed according to a Boolean function, wherein a first, "true" value is associated with the student if the comparison of the likelihood of a next correct answer and the completion threshold indicates mastery, and a second, "false" value is associated with the proposed assignment if the comparison of the likelihood of a next correct answer and the completion threshold indicates non-mastery. In some embodiments, the threshold specifies a likelihood of correct next answer (a desired next response), a number of correct answers, a number of correct answers without any intervening incorrect answers (an undesired next response), a likelihood of a correct next answer to a question of a specified difficulty, or the like.

After the likelihood of a next correct answer has been compared to the completion threshold, the process 750 proceeds to decision block 770, wherein it is determined if the user has attained mastery and/or whether data acceptance of the data packets of the aggregation has occurred. In some embodiments, this can include determining whether the first value or the second value is associated with the user. If it is determined that the first value is associated with the student, then the process 750 proceeds to block 772, wherein a mastery value is assigned to the user, which mastery value is indicative of mastery of subject matter by the user. After the mastery value has been assigned to the student, the process 750 proceeds to block 774, wherein a completion message is generated and/or delivered to the user and/or user-supervisor of the user via one of the user devices 106. If the mastery value is associated with the user, the user's mastery of the subject matter of the aggregation can be indicated in the completion message.

Returning again to decision block 770, if it is determined that the second value is not associated with the student, then the process 750 proceeds to decision block 776, wherein it is determined if the aggregation is complete. In some embodiments, this can include determining whether the user has reached a maximum number of received and/or responded to assessment data packets, whether the user has reached and/or exceeded a maximum time, or the like. If it is determined that the aggregation is complete, the process can proceed to block 774 and continue as outlined above. However, as the user has not mastered the subject matter of the aggregation, the user's non-mastery of the subject matter of the aggregation can be indicated in the completion message.

In some embodiments, process 750 can additionally track the amount of time spent responding to data packets relating to a specific subject and/or the number of data packets answered relating to a specific subject. In some embodiments, if a threshold is exceeded, which threshold specifies a maximum amount of time to spend on a specific subject and/or a maximum amount of data packets answered relating to a specific subject, then, regardless of the student's level of mastery, the teacher can be notified that the student has not successfully mastered the specific subject, and additional assistance to the student can be requested and/or provided.

Returning again to decision block 776, if it is determined that the aggregation is not complete, the process 750 proceeds to block 778, wherein a data packet with an attribute corresponding to one or several user attributes is selected, and specifically wherein a data packet with a difficulty level corresponding to the user's skill level is selected. In some embodiments, this can include selecting a data packet that is easier to thereby increase the user likelihood of a desired next response. After the data packet has been selected, the process 750 proceeds to block 780, wherein the data packet is proved to the user via the user device 106.

After the data packet has been provided, the process 750 can proceed to block 782, wherein a user response and/or input is received. In some embodiments, this user response can be used to update the user data, and the process 750 can then proceed to block 752 and continue as outlined above until mastery is achieved or until the aggregation is completed.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for increasing data transmission rates through a content distribution network by generating a customized aggregation comprising data packets selected to maximize a data acceptance rate, the system comprising:
   a memory comprising:
      a content library database comprising a plurality of data packets, wherein the plurality of data packets comprise a plurality of delivery data packets and a plurality of assessment data packets; and
      a user profile database, wherein the user profile database includes information identifying a cohort of users, and wherein the user profile database includes information identifying plurality of at least one attribute of each of the users in the cohort of users;
   at least one server configured to:
      receive aggregation information identifying an aggregation comprising a set of delivery data packets and a set of assessment data packets;
      receive data packet data from the content library database;
      identify a recipient cohort, wherein the recipient cohort comprises a group of users designated to receive the aggregation via a plurality of user devices;
      determine a recipient cohort elapsed time, wherein the recipient cohort elapsed time characterizes an amount of time for acceptance of a plurality of previous aggregations by the recipient cohort;
      generate an estimate of data packet transfer time for the aggregation, wherein the data packet transfer time is an amount of time between sending of a first data packet in the aggregation and receiving a final response from a user device;
      generate an updated aggregation based on the recipient cohort elapsed time and the estimate of data packet transfer time;
      generate a modeled aggregation outcome, wherein the aggregation outcome comprises a prediction of a change in a skill level for the recipient cohort;
      retrieve a target parameter identifying a desired change to the skill level for the recipient cohort;
      generate a modeled aggregation contribution, wherein the aggregation contribution indicates a degree to which the aggregation contributes to reaching the target parameter affected by the estimate of data packet transfer time;
      generate a modeled alternative contribution, wherein the alternative contribution indicates a degree to which an alternative aggregation contributes to reaching the target parameter affected by an estimate of data packet transfer time for the alternative contribution; and determine a difference between the modeled aggregation contribution and the modeled alternative contribution;

wherein the updated aggregation based on the recipient cohort elapsed time and the estimate of data packet transfer time is generated when the alternative contribution is greater than the modeled aggregation contribution; and provide the updated aggregation to the user devices.

2. The system of claim 1, wherein the data packet data comprises data packet user data and data packet metadata.

3. The system of claim 1, further comprising a plurality of user devices connected to the at least one server via a communication network.

4. The system of claim 1, wherein the amount of time for the acceptance of a plurality of previous aggregations by the recipient cohort is determined by a timer triggered and stopped by receipt of communications by the at least one server.

5. The system of claim 4, wherein the timer is located in the at least one server, and wherein the received communications comprise a first communication sent by the at least one server to the user device containing the first data packet in the aggregation and a second communication sent by the user device to the at least one server containing the final response to the aggregation.

6. The system of claim 4, further comprising a plurality of user devices, wherein each of the user devices comprises a timer, and wherein the received communications triggering and stopping the timer in one of the user devices comprises a first communication received by the user device from the at least one server, wherein the first communication triggers the timer, and wherein the first communication contains the first data packet in the aggregation, and a second communication sent by the user device to the at least one server, wherein the second communication stops the timer, and wherein the second communication contains the final response to the aggregation.

7. The system of claim 6, wherein each of the plurality of user devices is configured to send a time communication indicative of elapsed time measured by the timer.

8. The system of claim 7, wherein the time communication is sent when the timer is stopped.

9. The system of claim 8, wherein the time communication is periodically sent after the timer has been triggered and before the timer has been stopped.

10. A method for increasing data transmission rates through a content distribution network by generating a customized aggregation comprising data packets selected to maximize a data acceptance rate, the method comprising:

receiving at at least one server aggregation information identifying an aggregation comprising a set of delivery data packets and a set of assessment data packets from a content library database comprising a plurality of delivery data packets and a plurality of assessment data packets;

receiving at the at least one server data packet data from the content library database;

retrieving at the at least one server data from a user profile database identifying a recipient cohort, wherein the recipient cohort comprises a group of users designated to receive the aggregation via a plurality of user devices;

determining with the at least one server a recipient cohort elapsed time from data received from the user profile database, wherein the recipient cohort elapsed time characterizes an amount of time for acceptance of a plurality of previous aggregations by the recipient cohort;

generating with the at least one server an estimate of data packet transfer time for the aggregation, wherein the data packet transfer time is an amount of time between sending of a first data packet in the aggregation and receiving a final response from a user device;

generating with the at least one server an updated aggregation based on the recipient cohort elapsed time and the estimate of data packet transfer time;

generating a modeled aggregation outcome, wherein the aggregation outcome comprises a prediction of a change in a skill level for the recipient cohort;

retrieving a target parameter identifying a desired change to the skill level for the recipient cohort;

generating a modeled aggregation contribution, wherein the aggregation contribution indicates a degree to which the aggregation contributes to reaching the target parameter affected by the estimate of data packet transfer time;

generating a modeled alternative contribution, wherein the alternative contribution indicates a degree to which an alternative aggregation contributes to reaching the target parameter affected by an estimate of data packet transfer time for the alternative contribution; and determining a difference between the modeled aggregation contribution and the modeled alternative contribution;

wherein the updated aggregation based on the recipient cohort elapsed time and the estimate of data packet transfer time is generated when the alternative contribution is greater than the modeled aggregation contribution; and providing with the at least one server the updated aggregation to the user devices.

11. The method of claim 10, wherein the data packet data comprises data packet user data and data packet metadata.

12. The method of claim 10, wherein the amount of time for the acceptance of a plurality of previous aggregations by the recipient cohort is determined by a timer triggered and stopped by receipt of communications by the server.

13. The method of claim 12, wherein the timer is located in the at least one server, and wherein the received communications comprise a first communication sent by the at least one server to the user device containing the first data packet in the aggregation and a second communication sent by the user device to the at least one server containing the final response to the aggregation.

14. The method of claim 12, further comprising receiving a time communication from the user device indicative of elapsed time measured by the timer located on the user device.

15. The method of claim 14, wherein the received communications triggering and stopping the timer in the user device comprises a first communication received by the user device from the at least one server, wherein the first communication triggers the timer, and wherein the first communication contains the first data packet in the aggregation, and a second communication sent by the user device to the at least one server, wherein the second communication the timer, and wherein the second communication contains the final response to the aggregation.

16. The method of claim 15, wherein the time communication is sent when the timer is stopped.

17. The method of claim 16, wherein the time communication is periodically sent after the timer has been triggered and before the timer has been stopped.

* * * * *